United States Patent [19]
Creed

[11] Patent Number: 4,793,128
[45] Date of Patent: Dec. 27, 1988

[54] HORIZONTAL FORCE BALANCED SHAKER AND METHOD

[75] Inventor: Sherman H. Creed, Fresno, Calif.

[73] Assignee: FMC Corporation, Chicago, Ill.

[21] Appl. No.: 940,388

[22] Filed: Dec. 11, 1986

[51] Int. Cl.⁴ .............................................. A01D 46/26
[52] U.S. Cl. ...................................... 56/330; 56/340.1
[58] Field of Search ............... 56/328 R, 328 TS, 329, 56/330, 1, 2

[56] References Cited

U.S. PATENT DOCUMENTS

| | | | |
|---|---|---|---|
| 4,016,711 | 4/1977 | Claxton | 56/330 |
| 4,198,801 | 4/1980 | Claxton | 56/330 |
| 4,207,727 | 6/1980 | Poytress | 56/330 |
| 4,286,426 | 9/1981 | Orlando et al. | 56/328 TS |
| 4,336,682 | 6/1982 | Orlando | 56/1 |
| 4,418,521 | 12/1983 | Orlando et al. | 56/330 |
| 4,432,190 | 2/1984 | Orlando | 56/1 |
| 4,621,488 | 11/1986 | Claxton | 56/330 |

FOREIGN PATENT DOCUMENTS

| | | | |
|---|---|---|---|
| 2417247 | 10/1979 | France | 56/330 |
| 2151445 | 7/1985 | United Kingdom | 56/328 R |

*Primary Examiner*—John Weiss
*Attorney, Agent, or Firm*—A. J. Moore; H. M. Stanley; R. B. Megley

[57] ABSTRACT

A horizontal force balance shaker includes a horizontal shaking head supported for horizontal movement by parallelogram linkages. Counterweights are secured to concentric shafts for rotation at the same speed in opposite directions about an axis thereby causing the shaker head to oscillate horizontally. The axis may be oriented horizontally or vertically, and the shaking head may be advantageously used in row crop harvesters such as grape harvesters.

23 Claims, 6 Drawing Sheets

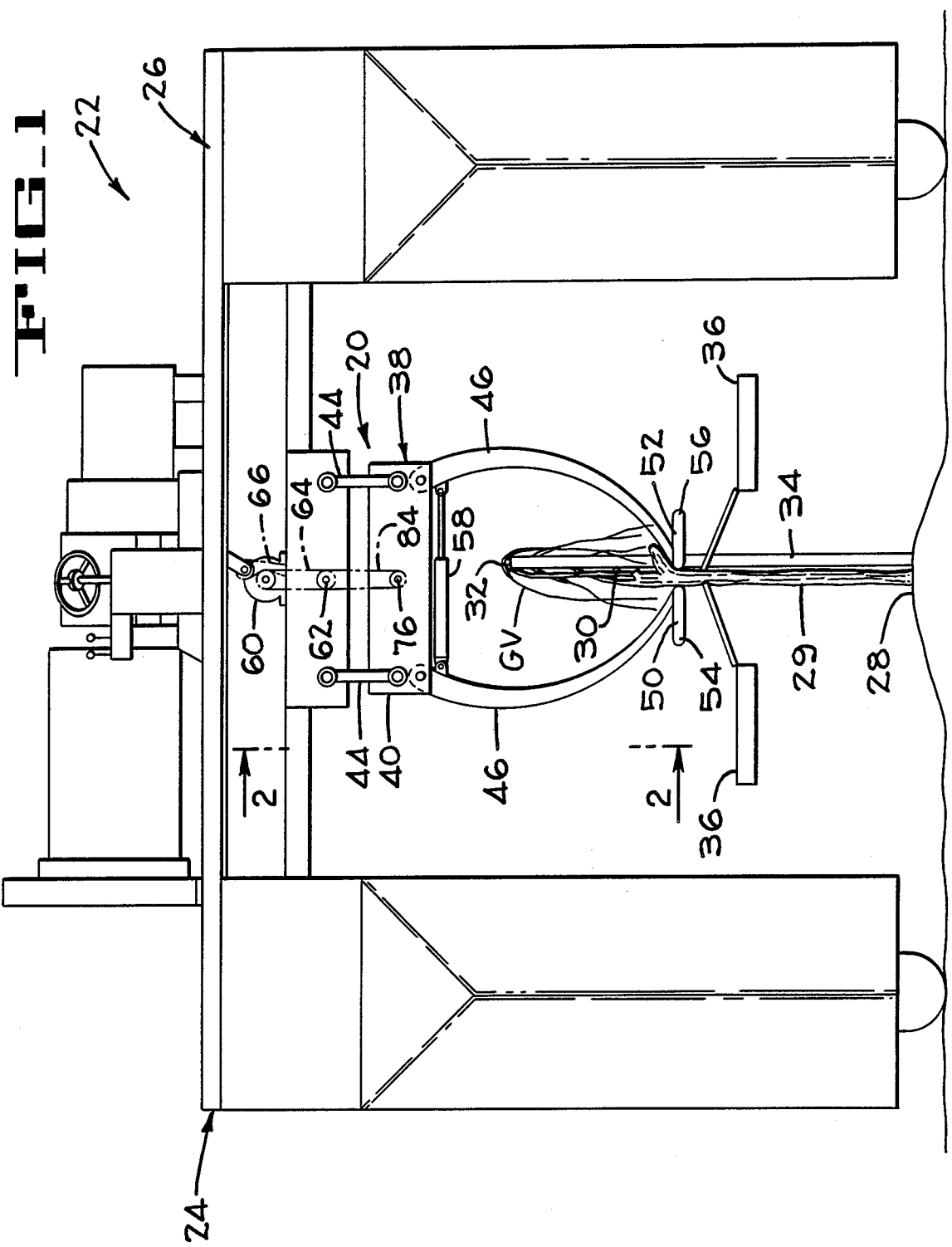

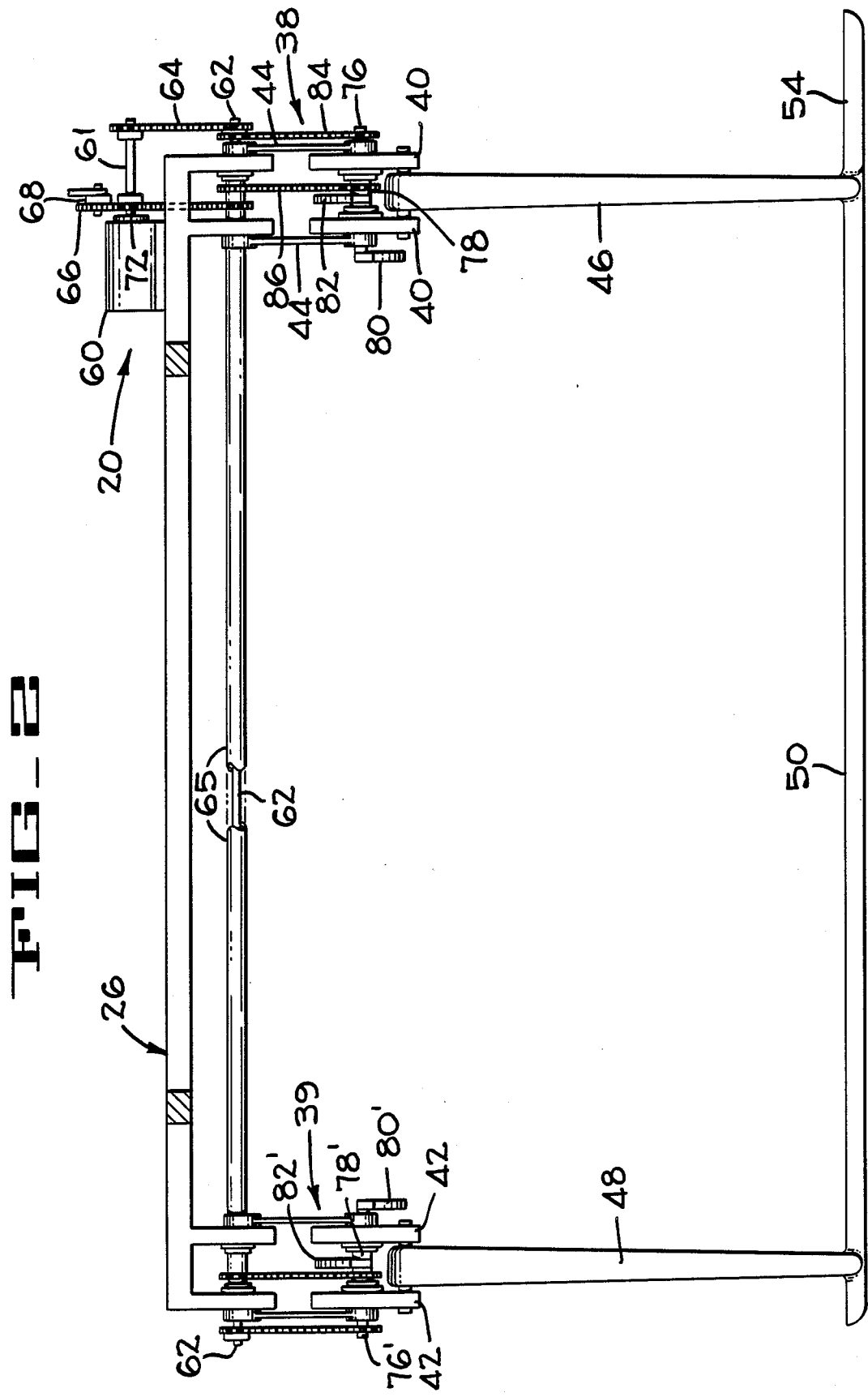

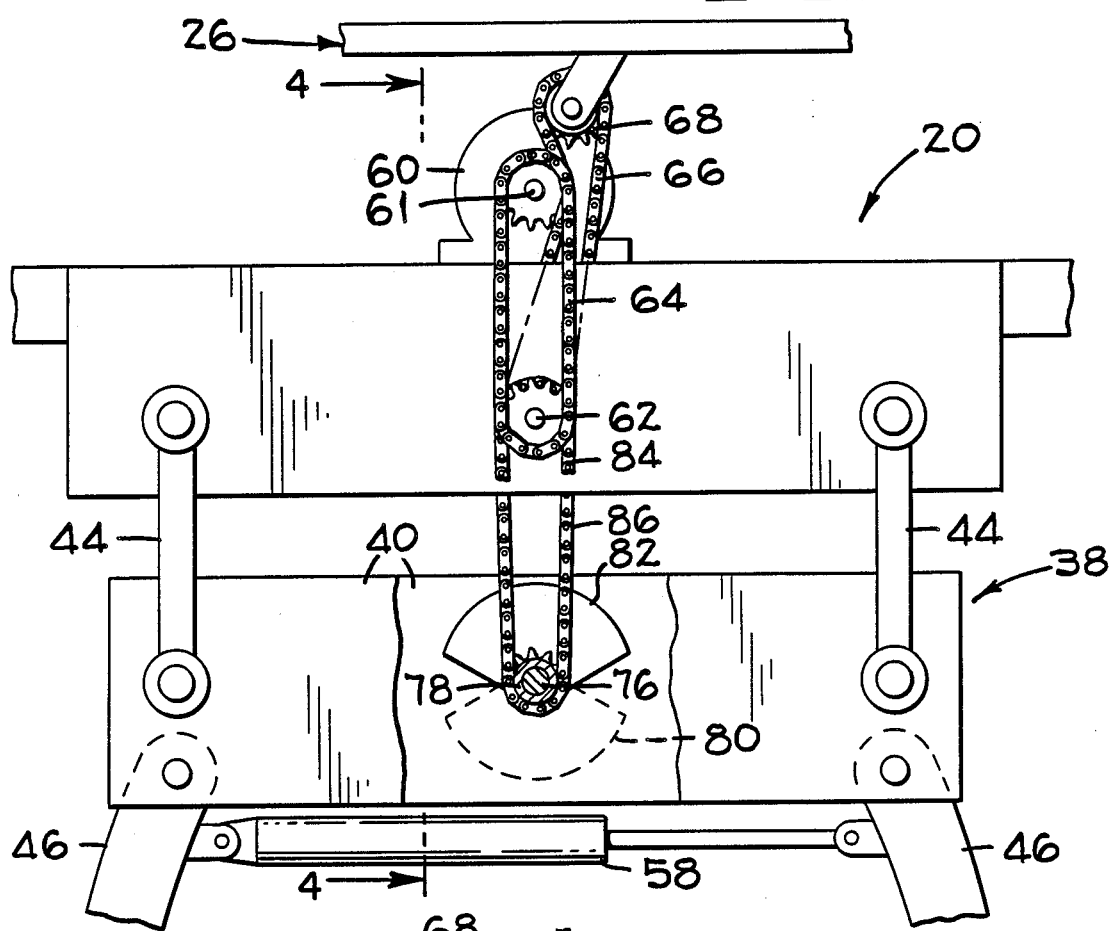

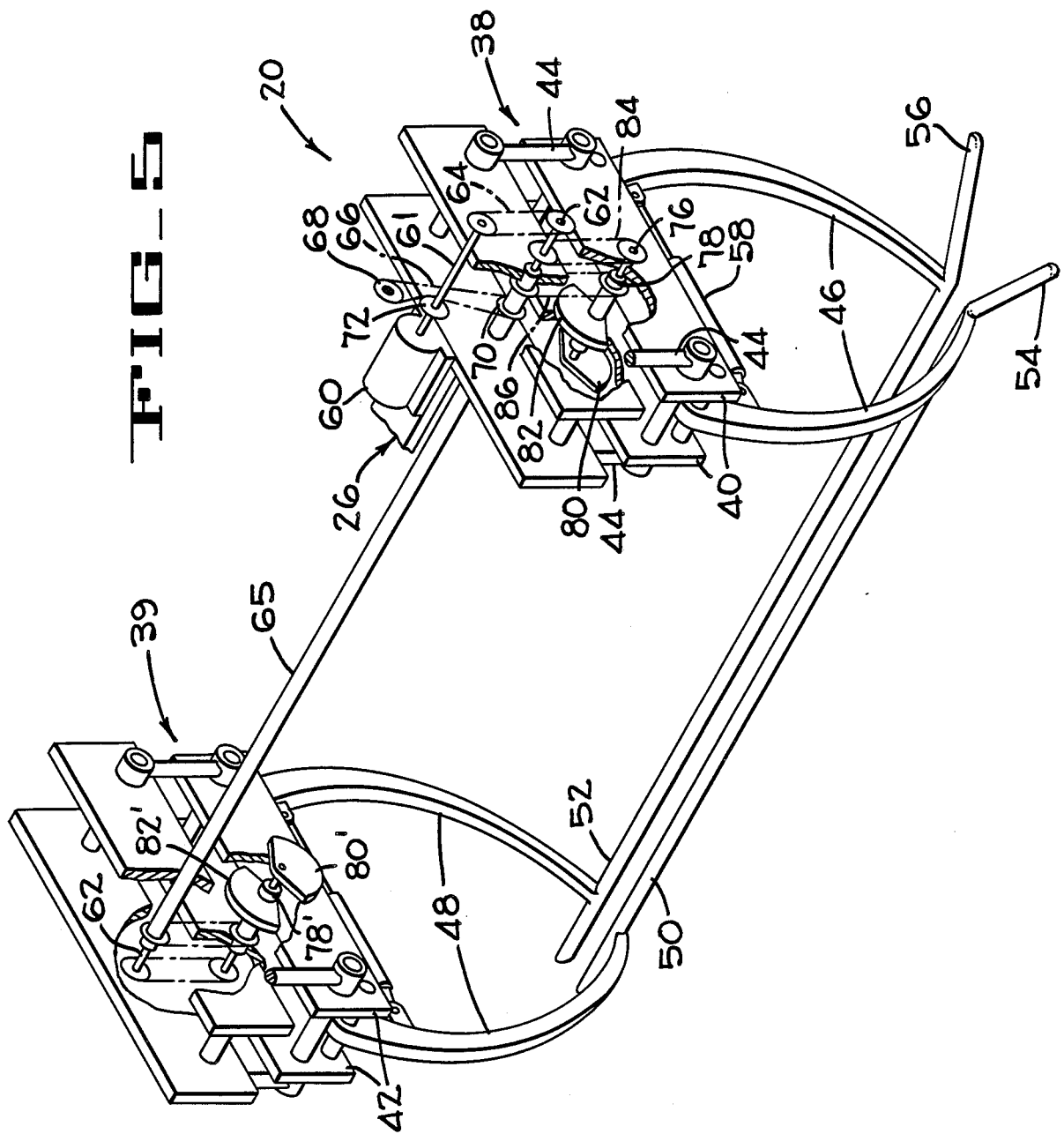

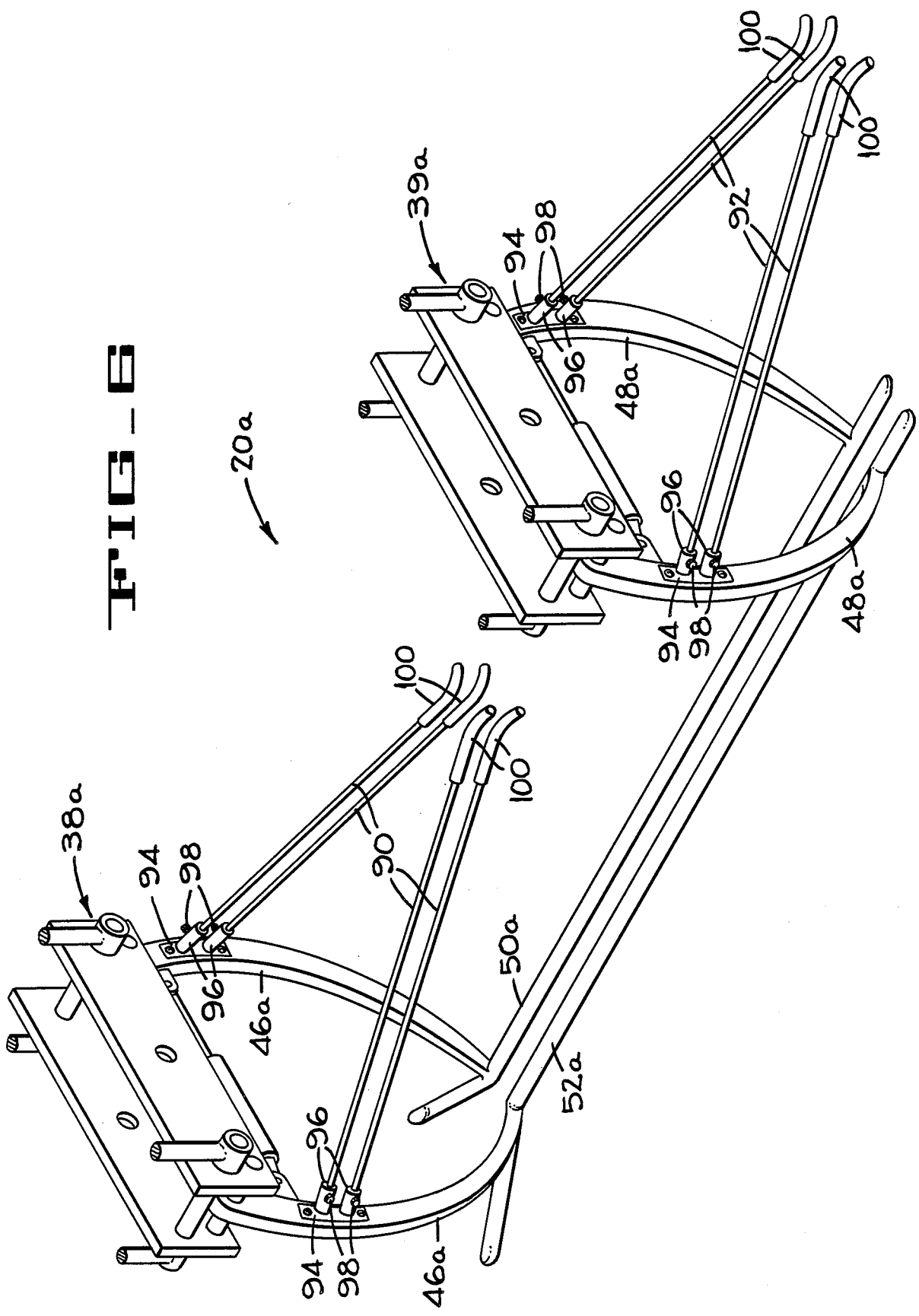

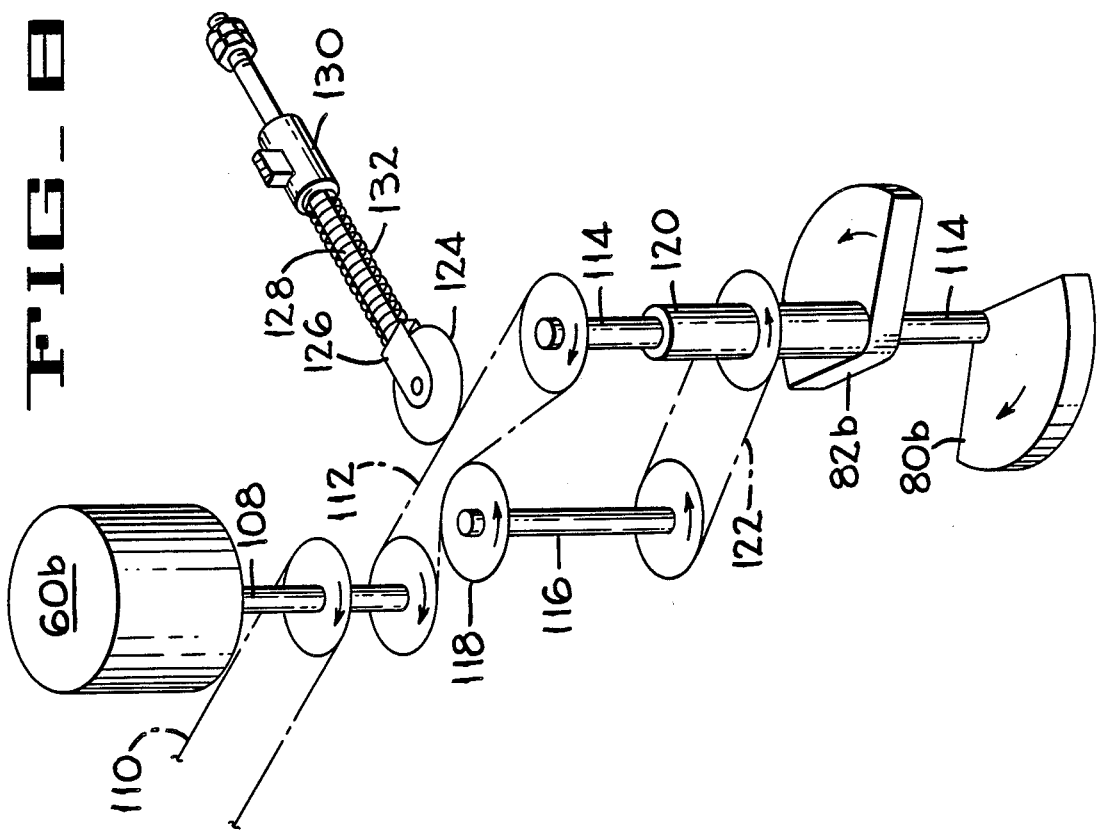
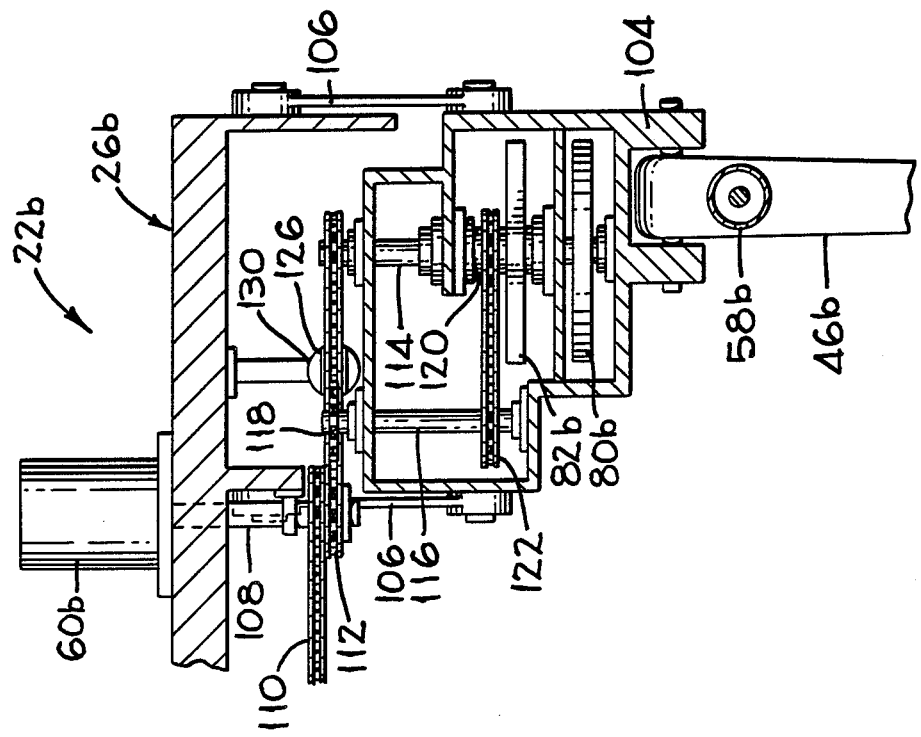

HORIZONTAL FORCE BALANCED SHAKER AND METHOD

BACKGROUND OF THE INVENTION

1. Field of the Invention

The present invention relates to method and apparatus for harvesting row crops such as grapes.

2. Description of the Prior Art

The present invention relates to harvesters or the like such as the harvesters of the type disclosed in U.S. Pat. Nos. to Orlando 4,336,682 which issued on June 29, 1982; 4,432,190 which issued on Feb. 21, 1984; and Orlando et al U.S. Pat. No. 4,418,521 which issued on Dec. 6, 1983; all of which are assigned to the Assignee of the present invention.

SUMMARY OF THE INVENTION

In accordance with the present invention a method and apparatus for harvesting grapes is disclosed using front and rear shaking units supported by the chassis of a force balanced grape harvester. Each unit includes an oscillating head movably connected to the vehicle frame or chassis by parallelogram linkages and pairs of chain drives which rotate eccentric weights on the oscillating head causing the head to oscillate transversely of the vehicle. Pairs of front and rear bowed legs are pivotally supported by the heads and have elongated trunk shaking members or skis secured to their lower ends for engaging and shaking the trunks of the vines. The upper portion as well as the lower portion of the heads are oscillated through the same horizontal stroke thus permitting striker bars to be added to the upper portion of each head thereby more effectively dislodging certain varieties of grapes from their vines by using both upper stroker bars and lower trunk engaging members while harvesting. Hydraulic rams on the heads permit the skis to be locked in shaking position or separated sufficiently to avoid contacting posts or the like in the path of movement of the vehicle.

BRIEF DESCRIPTION OF THE DRAWINGS

FIG. 1 is a diagrammatic front elevation of a grape harvester shown in position to shake the trunk of a vine supported by trellis wires with a trellis post shown rearwardly of the harvester.

FIG. 2 is a section taken along lines 2—2 of FIG. 1.

FIG. 3 is an enlarged front elevation of one of the shaking units illustrating the oscillating drive for the unit.

FIG. 4 is a section taken along lines 4-4 of FIG. 3.

FIG. 5 is a diagrammatic perspective of the harvester shaking units, certain parts being cut away.

FIG. 6 is a diagrammatic perspective of a portion of a second embodiment of the invention illustrating the shaking units fitted with pairs of foliage strikers.

FIG. 7 is a longitudinal central section of a portion of a third embodiment of the invention illustrating a modified form of one of the shaking units showing eccentric weights mounted for rotation about a vertical axis.

FIG. 8 is a diagrammatic perspective illustrating the drive for one of the shaking units in the third embodiment in more detail.

DESCRIPTION OF THE PREFERRED EMBODIMENT

A first embodiment of the horizontal force balanced shaking mechanism 20 (FIGS. 1-5) is shown mounted on a self-propelled row crop harvester such as a grape harvester 22 (FIG. 1). The grape harvester in general comprises a mobile self-propelled vehicle 24 having an inverted generally U-shaped chassis 26 which straddles and is driven down rows 28 of grape vines GV to be harvested. As indicated in FIG. 1, each row of grapevines includes trunks 29 with the vines trained over trellis wires 30,32 and with the wires supported on posts 34. On some varieties of grapes, the lower wire 30 support cordons of the vines on which the bunches of grapes grow, while the upper wire 32 supports the non-fruit bearing canes. On other varieties, the grapes are supported by both wires.

The harvester 22 supports the shaker mechanism 20 which shakes the fruit from the vines onto conventional collecting conveyors 36 which transport the grapes to conventional means (not shown).

The first embodiment of the shaking mechanism 20 (FIGS. 2-5) comprises front and rear oscillating shaker heads 38,39 which include a horizontally oscillatable front frame 40 and an identical rear frame 42. Each frame 40,42 is suspended from the chassis 26 by four connecting links 44 defining parallelogram linkages. A pair of front legs 46 and a pair of rear legs 48 are pivotally connected to the front frame 40 and rear frame 42, respectively. The lower end of the legs 46,48 are connected to trunk engaging skis 50,52 having tapered forward ends 54,56. In order to lock the legs and skis 50,22 in position closely adjacent the trunks 29 of the grape vines during the grape shaking operation as illustrated in FIG. 1, and to separate the skis a greater distance from each other to avoid posts 34 or other abutments or the like in the rows, a hydraulic cylinder 58 (FIG. 3) is pivotally connected between the two legs 46,46 and 48,48 of the front and rear shaking heads 38,39.

As best shown in FIGS. 2-5, the oscillating drive for the shaking heads 38,39 receives power from a hydraulic motor 60 driving a shaft 61 which is connected to an elongated, small diameter drive shaft 62 by a chain drive 64. The small drive shaft 62 extends in excess of the full distance between the front legs 46 and the rear legs 48 as shown in FIGS. 2 and 5, and is journaled to the chassis 26 within a large tubular shaft 65 which is journaled on the chassis 26. A second chain drive 66 is connected between an idler sprocket 68, a sprocket 70 (FIG. 5) on the tubular shaft 65, and engages one side of a second sprocket 72 on the motor shaft 61. Thus, the small diameter shaft 62 and the tubular shaft 65 are driven at the same speed and in opposite directions since all of the above described sprockets are of the same diameter.

The horizontal oscillating front frame 40 (FIGS. 3 and 4) has a small diameter shaft 76 and a concentric tubular shaft 78 journaled therein. Counterweights 80 and 82 of equal size and weight are secured to the shafts 76 and 78 and are 180° out of phase with each other as illustrated in FIG. 3. A chain drive 84 is connected between the shafts 62 and 76, and another chain drive 86 is connected between the tubular shafts 65 and 78. The spacing between the axes of the shafts 62,76 (FIG. 3) is the same as that between the pivotal axes of the parallelogram linkages 44. Thus, the rotation of the out of phase counterweights 80,82 will cause the front oscillating frame 40 to oscillate horizontally thereby moving the legs 46 and skis 50 transversely of the rows 28.

As illustrated in FIGS. 2 and 5, the components for oscillating the rear frame 42 are the same as that described in the last paragraph except that the counterweights 80' and 82' on shafts 76' and 78', respectively, are faced forwardly rather than rearwardly. Thus, the front and rear counterweights will oscillate the front and rear frames 40,42 horizontally in the same direction and at the same time during operation of the grape harvester.

Many varieties of grapes are best harvested by shaking the trunks 34 (FIG. 1) of the vines by apparatus such as that illustrated in FIGS. 1-5. However, certain varieties of grapes are more efficiently harvested when both the trunks and the vines are shaken.

FIG. 6 illustrates a portion of a second embodiment of a horizontal force balanced shaking mechanism 20a which is identical to the mechanism 20 except that flexible foliage striker bars 90,92 are added to the front and rear heads 38a and 39a. Since the second embodiment of the invention is the same as the first embodiment except for the striker bars, only those components necessary to the understanding of the invention will be described and parts of the second embodiment which are the same as those of the first embodiment will be assigned by the same numerals followed by the letter "a".

The striker bars 90 are removably connected to the front legs 46a by brackets 94 having tubular portions 96 within which one end of the striker bars 90 are inserted and clamped in place by a screw 98. The rear striker bars 92 are similarly mounted on the rear legs 48a by brackets 94 and screws 98. As illustrated in FIG. 6, the foliage striker bars 90,92 are angled inwardly and rearwardly of the harvester and cooperate with the skis 50a,52a when harvesting the grapes. Since the upper portion of each shaker head 38a,39a are horizontally oscillated through the same stroke as the skis, the vines are more effectively shaken.

Each flexible foliage striker bar is preferably constructed of fiberglass and includes a metal wear resistant arcuate tip portion 100 bonded thereto.

A third embodiment of the invention is diagrammatically illustrated in FIGS. 7 and 8 and is similar to that of the first embodiment except that the counterweights 80b,82b in each shaking head is mounted for rotation about a generally vertical rather than a horizontal axis. Accordingly, only a fragment of the third embodiment illustrating the drive to the counterweights 80b,82b, and a horizontal oscillatable front frame 104 in which it is mounted, will be described.

The front frame 104 is connected to the chassis 26b of the grape harvester 22b for horizontal oscillatory movement by four parallelogram linkages 106 (only two being shown). A pair of front legs 46b (only one being shown) are pivotally connected to the front frame 104 and are held in desired spaced relationship by a hydraulic cylinder 58b.

A hydraulic motor 60b is secured to the chassis 26b and has a shaft 108 connected to a first chain drive 110 leading to the rear horizontally oscillatable frame (not shown). A second chain drive 112 is connected between the motor shaft 108 and a small, vertically disposed counterweight shaft 114 journaled in the front oscillating frame 104. A second vertically disposed shaft 116 is journaled in the frame 104 and has a sprocket 118 keyed thereon which engages one run of the chain 112 thus being driven in a direction opposite to that of the shaft 114. The shaft 116 is connected to a tubular shaft 120, which is concentric with the shaft 114, by a chain drive 122. The counterweight 80b is secured to the shaft 114 and the counterweight 82b is connected to the tubular shaft 120 and rotate in opposite directions as indicated by the arrows in FIG. 8.

Since the shafts 114,116 and 120 oscillate horizontally and transversely of the grape harvester 22b, and since the motor shaft 108 remains in fixed vertical position relative to the harvester, the chain drive 112 will tend to loosen during a portion of the transverse travel of the front frame 104. Accordingly, an idler sprocket 124 engages the chain drive 112 and is journaled in a yoke 126 on the end of an elongated rod 128 that is slidably received in a bracket 130 and is held from rotation by a key or the like (not shown). The bracket is secured to the chassis 26b, and an elongated spring 132 is disposed between the yoke 126 and the bracket 130 and urges the sprocket 124 firmly against the chain 112 at all times thus maintaining the chain tight.

In operation of the first embodiment of the invention (FIGS. 1-5), the grape harvester is aligned with a row 28 (FIG. 1) to be harvested and the legs 46,48 and skis 50,52 are pivoted outwardly to clear a wide end post (not shown) at the end of the row by actuating the hydraulic cylinders 58. After entering the row, the hydraulic cylinders are actuated to move the skis closely adjacent the trunk 29 (approximately 4-6 inches apart), and the motor 70 is started to rotate the counterweights 80,82, 80',82' (FIG. 5) on both the front and rear heads 38,39 in opposite directions. It will be apparent that when the eccentric mass of both pairs of counterweights are moved to a position 90° to the right of that shown in FIGS. 3 and 5, centrifugal force will cause the shaker heads 38 and attached skis 50,52 to move horizontally to the right thereby causing the left ski 50 to contact the trunk and shake grapes from the vines as the harvester moves forward in a row 28. When the four counterweights move an additional 180° to the left (FIGS. 3 and 5), centrifugal force causes the right ski to contact the trunk 29 thereby shaking grapes from the vines. The parallelogram linkages 44 permit the shaking heads 38,39 to oscillate horizontally, and repeatedly contact the trunk as the harvester travels down the row.

The operation of the second embodiment of the invention illustrated in FIG. 6 is the same as that of the first embodiment except that the striker bars 90 and 92 alternately strike the vines with a whipping action at substantially the same time as the skis 50a,52a contact the trunks thereby dislodging the grapes from the vines. It will be understood that the skis and striker bars move through the same horizontal stroke.

The operation of the third embodiment illustrated in FIGS. 7 and 8 operate in the same manner as the first embodiment except that the front counterweights 80b,82b and similar rear counterweights (not shown) are rotated about substantially vertical shafts in the opposite directions.

From the foregoing description it is apparent that the first and second embodiments of the horizontal force balanced shaker of the present invention, when used on a grape harvester, rotates a pair of counterweights on each shaking head in opposite directions about a horizontal axis. The counterweights are mounted on a horizontally movable frame supported by parallelogram linkages to the chassis of the harvester and accordingly when the mass of both heads are oriented on the right side of the frame, the head will be moved by centrifugal force to the right; and when the mass is oriented on the left side of the frame, the head will be moved to the left. The second embodiment operates in a similar fashion except that the striker bars 90,92 strike the foliage and aid in shaking the grapes from the vines. The third embodiment also operates in a similar fashion except that the counterweights are mounted on concentric vertical shafts.

Although the best mode contemplated for carrying out the present invention has been herein shown and described, it will be apparent that modification and variation may be made without departing from what is regarded to be the subject matter of the invention.

What is claimed is:

1. A horizontal force balanced shaker, comprising:
   means defining a support frame;
   means defining a shaker head;
   means for connecting said shaker head to said support frame for horizontal oscillatory movement;
   a first counterweight;
   a second counterweight;
   means for eccentrically mounting said first counterweight for rotation about an axis;
   means for eccentrically mounting said second counterweight for rotation about said axis; and
   drive means for rotating said first and second counterweights about said axis in opposite directions for alternately oscillating said shaker head horizontally.

2. An apparatus according to claim 1 wherein said axis is a horizontal axis.

3. An apparatus according to claim 2 and additionally comprising parallelogram linkage means connecting said shaker head to said support frame for oscillating said shaker head horizontal in response to rotation of said counterweight in opposite directions.

4. An apparatus according to claim 2 and additionally comprising a first shaft journaled in said shaker head and having said first counterweight secured thereto, a tubular shaft concentric with said first shaft and journaled in said shaker head and having said second counterweight secured thereto said drive means including chain drives for rotating said eccentrically mounting counterweights for alternately positioning the mass of both counterweights on one side and then on the other side of said axis thereby oscillating said shaker head horizontally.

5. An apparatus according to claim 1 wherein said first and second axes are concentric and are disposed vertically.

6. An apparatus according to claim 5 and additionally comprising parallelogram linkage means connecting said shaker head to said support frame for oscillating said shaker head horizontally in response to rotation of said counterweights in opposite directions about said concentric vertical axis.

7. An apparatus according to claim 6 and additionally comprising a first vertical shaft journaled in said shaker head and having said first counterweight secured thereto, a second vertical shaft concentric with said first shaft and journaled in said shaker head and having said second counterweight secured thereto; said drive means including chain drives for rotating said counterweights for alternately positioning the mass of both counterweights on one side and then on the other side of said axis thereby oscillating said shaker head horizontally.

8. An apparatus for harvesting crops from plant such as grapevines that are grown in rows, comprising:
   a vehicle having a chassis adapted to straddle a row of plants;
   a shaker assembly pivotally mounted on said chassis for continuously harvesting the plants as the vehicle is driven down the row, the shaker assembly including a front shaker head and a rear shaker head;
   means defining parallelogram linkages for separately mounting said front and rear shaker heads on said chassis, said parallelogram linkage means each including a plurality of links which are equal in length and remain parallel to each other during horizontal oscillatory movement of said associated heads;
   counterweight means for imparting horizontal oscillatory movement to said heads transversely of the direction of movement of the vehicle, said front shaker head including a first pair of counterweights and said rear shaker head including a second pair of counterweights, said first pair of counterweights being adapted to be rotated in opposite directions about a common axis and said second pair of counterweights being adapted to be rotated in opposite directions about a common axis;
   means defining opposed striker legs pivotally connected to said shaker heads;
   means defining skis operatively connected to the striker legs for alternately engaging opposite sides of a plant in the row; and
   means for oscillating the front and rear shaker heads transversely of the row for alternately engaging opposite sides of the plant for dislodging the crop from the plant.

9. An apparatus according to claim 8 and additionally comprising resilient foliage striker bars secured to said legs and angled inwardly and rearwardly of the harvester for striking the foliage of the plants for dislodging crops from the plants.

10. An apparatus according to claim 8 wherein said first pair of counterweights in said front shaker head, and said second pair of counterweights in said second shaker head are rotated about a common horizontal axis.

11. An apparatus according to claim 8 wherein said first pair of counterweights in said front shaker head are rotated in opposite directions about a common vertical axis, and wherein said second pair of counterweights in said second shaker head are rotated in opposite directions about a second vertical axis.

12. An apparatus for harvesting crops from plants such as grapevines that are grown in rows, comprising:
   a vehicle having a chassis adapted to straddle a row of plants;
   a shaker assembly pivotally mounted on said chassis for continuously harvesting the plants as the vehicle is driven down the row, the shaker assembly including a front shaker head and a rear shaker head;
   means defining parallelogram linkages for separately mounting said front and rear shaker heads on said chassis;
   means for imparting horizontal oscillatory movement to said heads transversely of the direction of movement of the vehicle;
   means defining opposed striker legs pivotally connected to said shaker heads;

means defining skis operatively connected to the striker legs for alternately engaging opposite sides of a plant in the row;

said means for oscillating the front and rear shaker heads transversely of the row for alternately engaging opposite sides of the plant for dislodging the crop from the plant;

said means for imparting horizontal oscillatory movement to each of said heads comprising;

a first counterweight supported by each head;

a second counterweight supported by each head;

means for eccentrically mounting said first counterweight for rotation about a first axis in a first direction opposite from that of said first direction; and power means for driving said first and second counterweights in opposite directions for oscillating said heads transversely of said rows.

13. An apparatus according to claim 12 wherein said counterweights are driven at the same speed in opposite direction.

14. An apparatus according to claim 12 wherein said axes are horizontal axes.

15. An apparatus according to claim 12 wherein said axes are vertical axes.

16. An apparatus according to claim 12 wherein said first counterweight is secured to a first shaft concentric with said axis, and wherein said second counterweight is secured to a tubular shaft concentric with said axis.

17. An apparatus according to claim 16 wherein said axis is horizontal.

18. An apparatus according to claim 16 wherein said axis is vertical.

19. An apparatus according to claim 16 wherein said first and second shafts are driven in opposite directions at the same speed.

20. A force balanced method of harvesting crops from plants such as grapevines that are grown in rows having abutments therein with a harvester having a shaker head with plant engaging members on each side of the row, comprising the steps of:

driving the harvester down a row of plants;

rotating a pair of eccentric counterweights journaled on a shaker head in opposite directions about a common axis for horizontally oscillating the shaker head and plant engaging means on each side of the row as a unit for dislodging fruit from the plant;

locking the plant engaging members from movement relative to the shaker head when harvesting the crop from the plant; and separating the plant engaging members when approaching an abutment in the row.

21. A method according to claim 20 wherein the counterweights are rotated in opposite directions at the same speed.

22. A method according to claim 12 wherein the counterweights are rotated about a common horizontal axis.

23. A method according to claim 21 wherein the counterweights are rotated about a common vertical axis.

* * * * *